United States Patent
Yang et al.

(10) Patent No.: US 8,294,862 B2
(45) Date of Patent: Oct. 23, 2012

(54) LIQUID CRYSTAL DISPLAY DEVICE AND METHOD OF FABRICATING THE SAME

(75) Inventors: Joon Young Yang, Wonmi-Gu (KR); Jung Ii Lee, Seoul (KR); Dong Su Shin, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1033 days.

(21) Appl. No.: 11/300,452

(22) Filed: Dec. 15, 2005

(65) Prior Publication Data

US 2006/0285046 A1   Dec. 21, 2006

(30) Foreign Application Priority Data

Jun. 15, 2005  (KR) .......................... 10-2005-0051651

(51) Int. Cl.
    *G02F 1/1343* (2006.01)
(52) U.S. Cl. ........................................ 349/141; 349/139
(58) Field of Classification Search .................. 349/139, 349/141
    See application file for complete search history.

(56) References Cited

U.S. PATENT DOCUMENTS

| 2002/0044244 | A1* | 4/2002 | Lee ................................ 349/141 |
| 2004/0027524 | A1* | 2/2004 | Shiota et al. ................... 349/129 |
| 2004/0125300 | A1* | 7/2004 | Lee ................................ 349/141 |
| 2004/0196426 | A1* | 10/2004 | Hsieh et al. ..................... 349/141 |
| 2005/0030463 | A1* | 2/2005 | Kaneko et al. ................. 349/147 |
| 2005/0208693 | A1* | 9/2005 | Youn et al. ....................... 438/30 |

FOREIGN PATENT DOCUMENTS

JP      2003-57673 A    2/2003

* cited by examiner

*Primary Examiner* — Jessica M Merlin
(74) *Attorney, Agent, or Firm* — Birch, Stewart, Kolasch & Birch, LLP

(57) ABSTRACT

A liquid crystal display device is provided. The liquid crystal display device includes a gate line and a data line formed on a substrate; a thin film transistor formed at an intersection of the gate line and the data line; a pixel electrode connected to the thin film transistor; a common electrode substantially parallel to the pixel electrode; and a conductive pattern in contact with the common electrode at a lateral side surface of the common electrode.

4 Claims, 17 Drawing Sheets

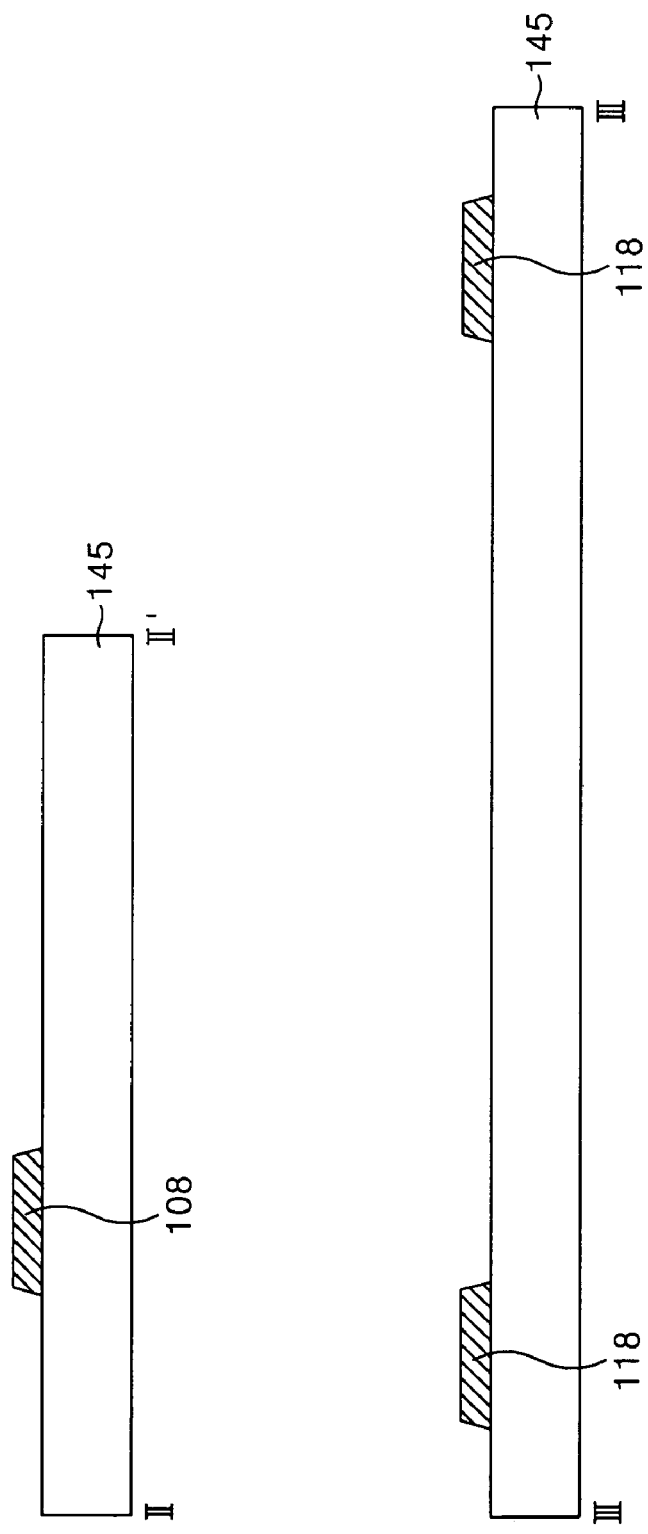

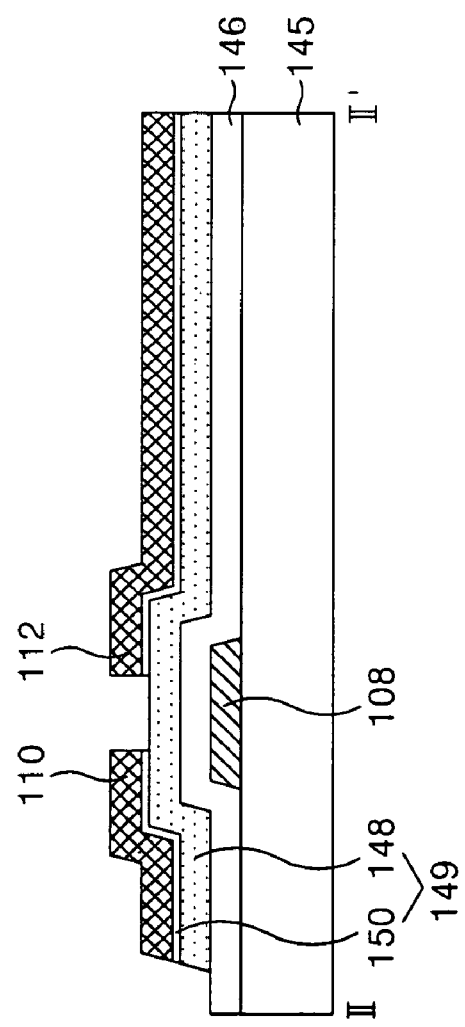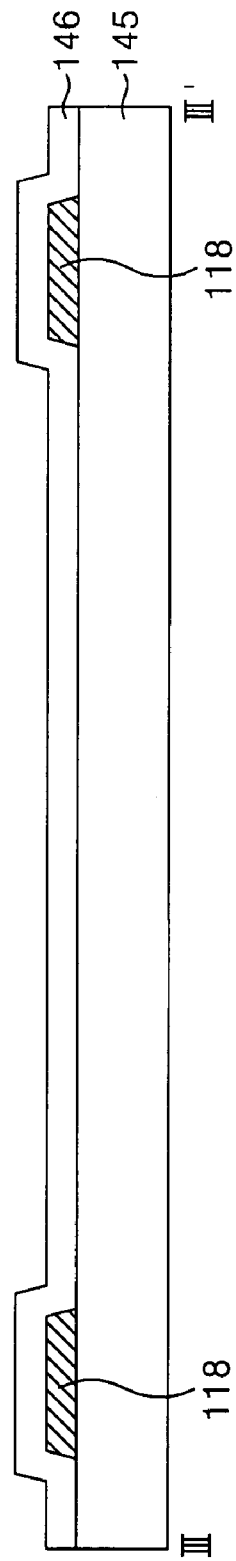

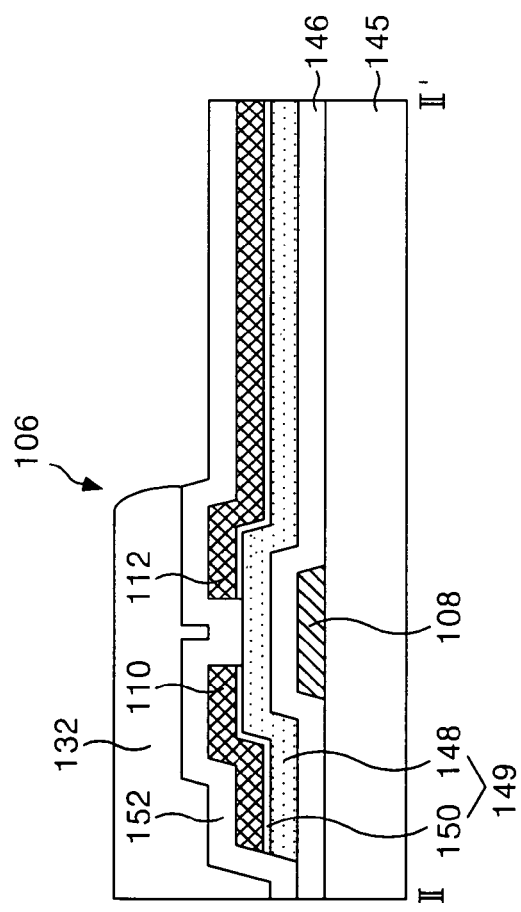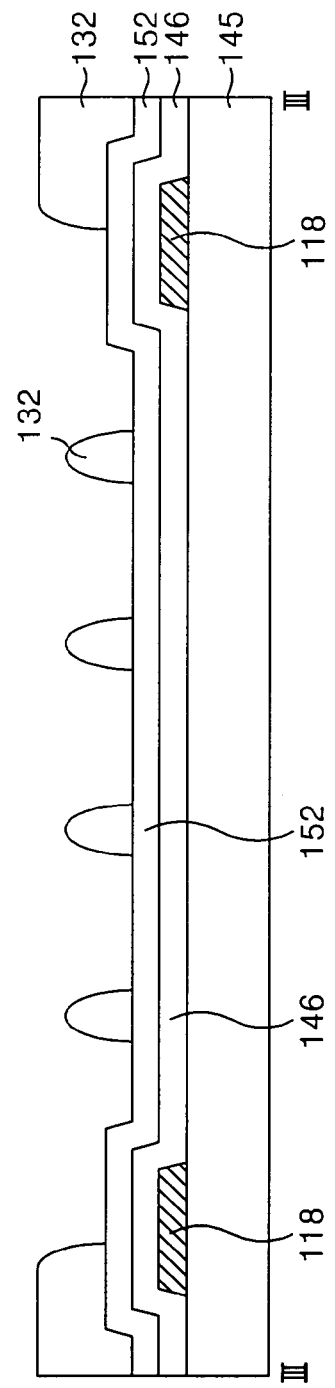

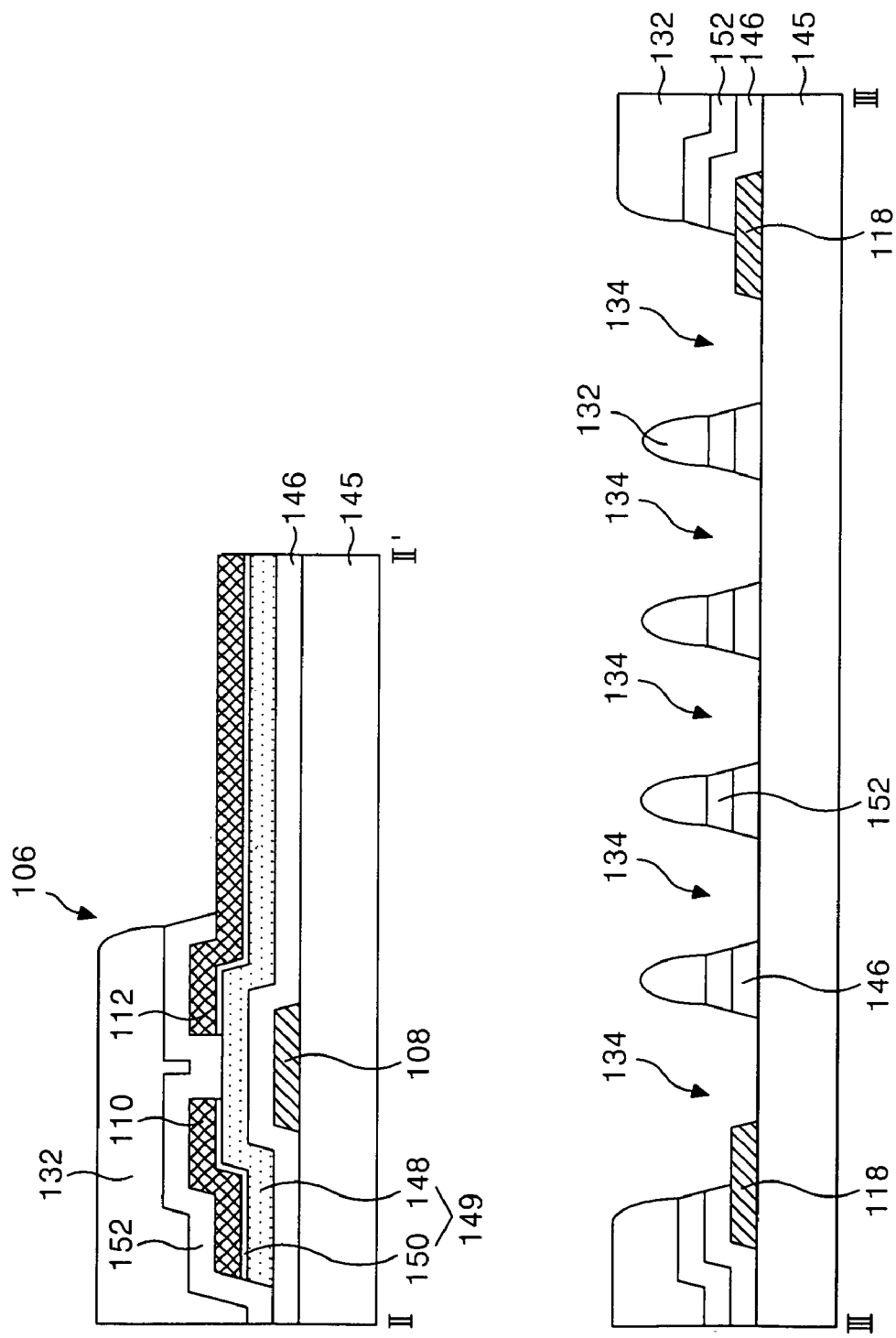

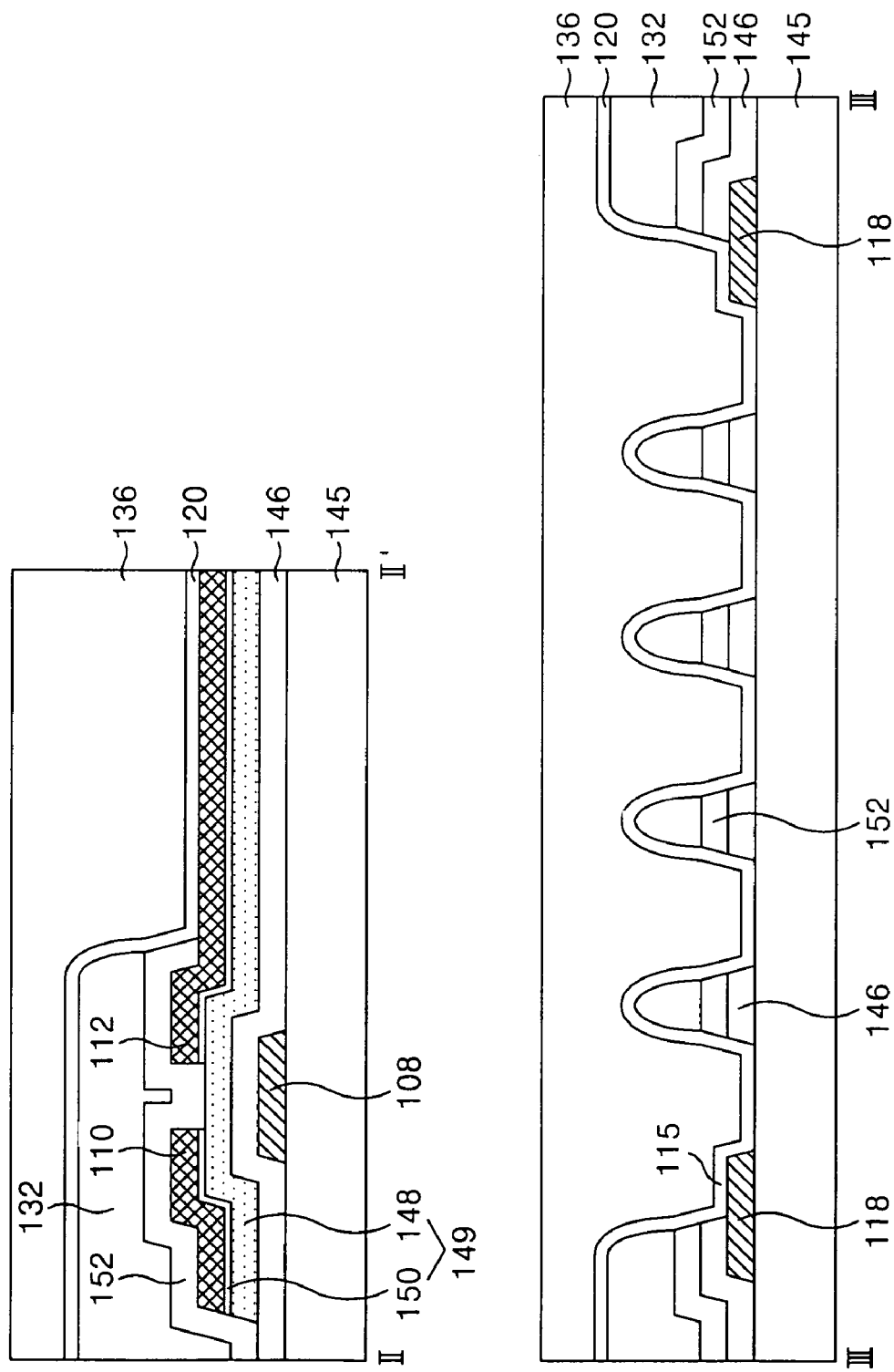

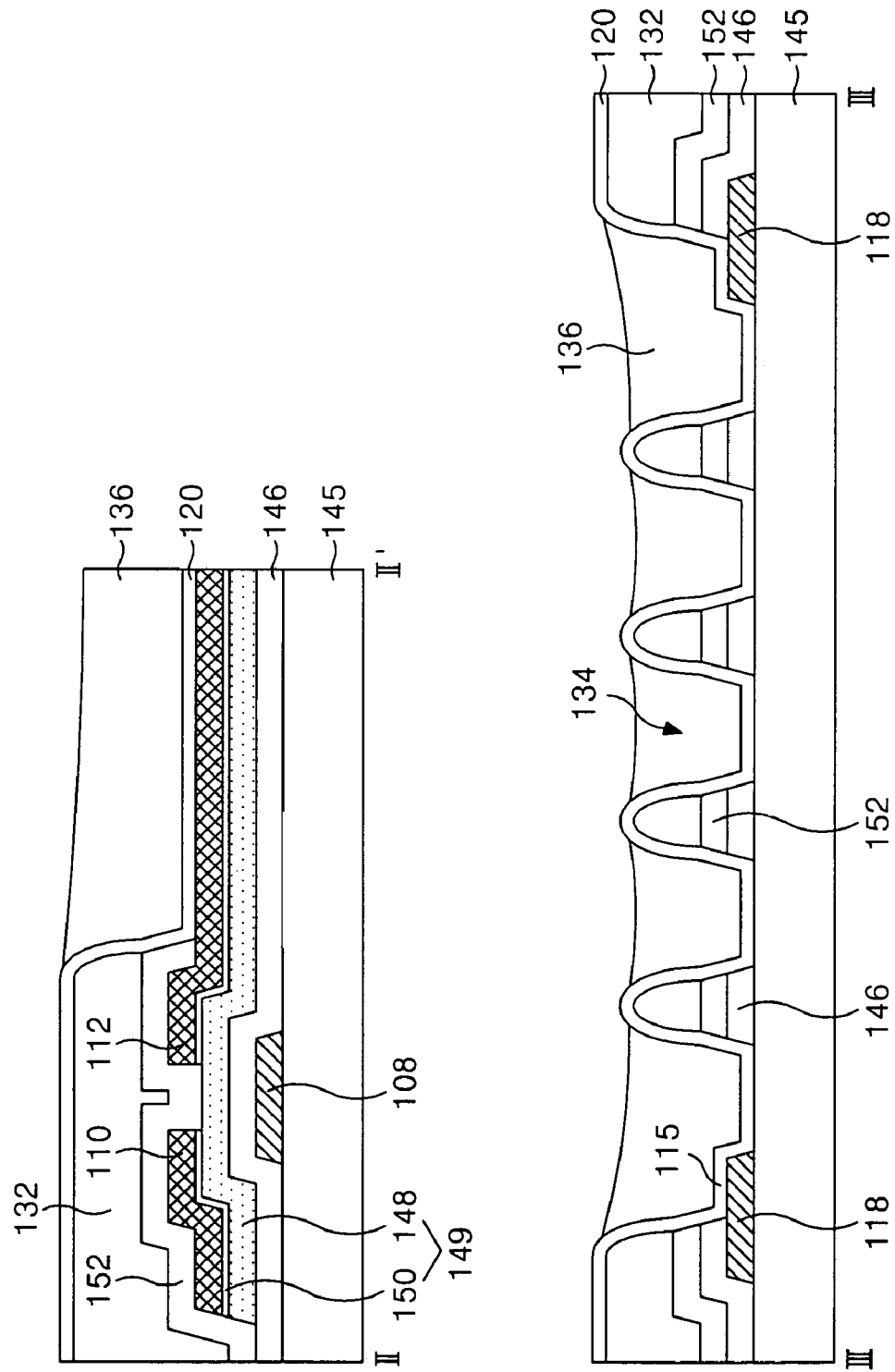

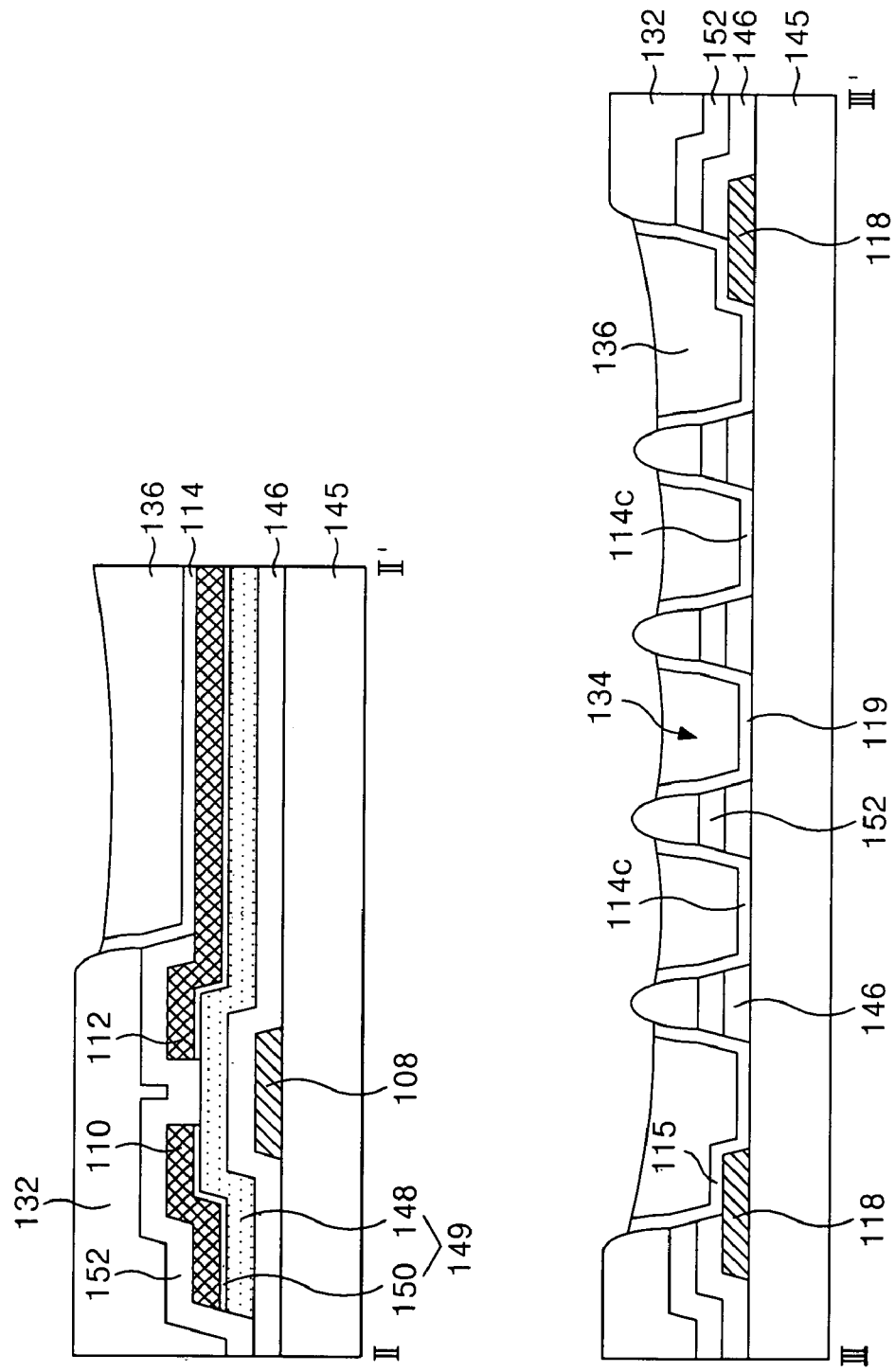

LIQUID CRYSTAL DISPLAY DEVICE AND METHOD OF FABRICATING THE SAME

This Nonprovisional Application claims priority under 35 U.S.C. §119(a) on Patent Application No. 10-2005-0051651 filed in Korea on Jun. 15, 2005, the entire contents of which are hereby incorporated by reference.

BACKGROUND OF THE INVENTION

1. Field of the Invention

The present invention relates to a liquid crystal display panel, and more particularly, to a liquid crystal display panel of a horizontal electric field type and a method of fabricating the same that is capable of simplifying the manufacturing process and reducing the cost.

2. Description of the Related Art

A liquid crystal displays (LCD) control light transmittance of liquid crystal using an electric field to thereby display a picture. The liquid crystal displays are largely classified into a vertical electric field type and a horizontal electric field type depending upon the direction of the electric field driving the liquid crystal material.

The liquid crystal display of a vertical electric field type drives a liquid crystal material in a twisted nematic (TN) mode with a vertical electric field formed between a pixel electrode and a common electrode arranged opposite to each other on the upper and lower substrates. The liquid crystal display of a vertical electric field type has an advantage of a large aperture ratio while having a drawback of a narrow viewing angle about 90°.

The liquid crystal display of a horizontal electric field type drives a liquid crystal in an in plane switch (IPS) mode with a horizontal electric field between the pixel electrode and the common electrode arranged in parallel to each other on the lower substrate. The liquid crystal display of a horizontal electric field type has an advantage of a wide viewing angle about 160°. Hereinafter, the liquid crystal display of a horizontal electric field type will be described in detail.

The liquid crystal display of a horizontal electric field type includes a thin film transistor substrate (i.e., a lower substrate) and a color filter substrate (i.e., an upper substrate) joined opposite to each other, a spacer for uniformly maintaining a cell gap between two substrates, and a liquid crystal material filled into the space provided by the spacer.

The thin film transistor substrate includes a plurality of signal lines and a plurality of thin film transistors for forming a horizontal electric field for each pixel, and an alignment film coated thereon to align the liquid crystal material. The color filter substrate includes a color filter for implementing a color, a black matrix for preventing a light leakage and an alignment film coated thereon to align the liquid crystal material.

FIG. 1 is a plan view illustrating a thin film transistor array substrate of a related art liquid crystal display panel of a horizontal electric type, and FIG. 2 is a cross-sectional view illustrating the thin film transistor array substrate taken along a line I-I' in FIG. 1.

Referring to FIG. 1 and FIG. 2, the thin film transistor array substrate includes a gate line 2 and a data line 4 provided on a lower substrate 45 in such a manner to intersect each other, a thin film transistor 6 provided at each intersection, a pixel electrode 14 and a common electrode 18 provided at a pixel area defined by the intersection structure for the purpose of forming a horizontal field, and a common line 16 connected to the common electrode 18.

The gate line 2 supplies a gate signal to a gate electrode 8 of the thin film transistor 6. The data line 4 supplies a pixel signal via a drain electrode 12 of the thin film transistor 6 to the pixel electrode 14. The gate line 2 and the data line 4 are formed in the intersection structure to define a pixel area 5.

The common line 16 is formed in parallel to the gate line with the pixel area 5 therebetween to supply a common voltage for driving the liquid crystal material to the common electrode 18.

The thin film transistor 6 allows the pixel signal of the data line 4 to be charged and maintained in the pixel electrode 14 in response to the gate signal of the gate line 2. To this end, the thin film transistor 6 includes the gate electrode 8 connected to the gate line 2, a source electrode 10 connected to the data line 4, and the drain electrode 12 connected to the pixel electrode 14. Further, the thin film transistor 6 further includes a semiconductor pattern 49 having an active layer 48, overlapping with the gate electrode 8 with having a gate insulating film 46 therebetween to define a channel between the source electrode 10 and the drain electrode 12. In the semiconductor pattern 49, an ohmic contact layer 50, located on the active layer 48 to make an ohmic contact with the data line 4, the source electrode 10, and the drain electrode 12, is further included.

The pixel electrode 14 is connected, via a contact hole 17, to the drain electrode 12 of the thin film transistor 6 and is provided at the pixel area 5. Particularly, the pixel electrode 14 includes a first horizontal part 14a connected to the drain electrode 12 and provided in parallel with adjacent gate lines 2, a second horizontal part 14b overlapping with the common line 16, and a finger part 14c provided in parallel between the first and second horizontal parts 14a and 14b.

The common electrode 18 is connected to the common line 16 and is formed of the same metal as the gate line 2 and the gate electrode 8 at the pixel area 5. Specifically, the common electrode 18 is in parallel with the finger part 14c of the pixel electrode 14 at the pixel area 5.

Accordingly, a horizontal electric field is formed between the pixel electrode 14 to which a pixel signal is supplied via the thin film transistor 6 and the common electrode 18 to which the common voltage is supplied via the common line 16. Specifically, the horizontal electric field is formed between the finger part 14C of the pixel electrode 14 and the common electrode 18. Liquid crystal molecules arranged in the horizontal direction between the thin film transistor array substrate and the color filter array substrate by such a horizontal electric field are rotated due to a dielectric anisotropy. Transmittance of a light transmitting the pixel area 5 is differentiated depending upon the extent of the rotation of the liquid crystal molecules, thereby implementing a gray level scale.

To form the thin film transistor array substrate of the related art liquid crystal display panel of a horizontal electric field type, a photolithography using at least four masks is used.

More particularly, a gate pattern including the gate electrode 8, the common electrode 18 and the common line 16 is formed by using a first mask process, the semiconductor pattern 49 and a source/drain pattern are formed by using a second mask process, a passivation film 52 having the contact hole 17 is formed by using a third mask process, and the pixel electrode 14 is formed by using a fourth mask process. Each mask process includes a lot of processes such as applying photo-resist, exposing, developing, cleaning, and inspection processes, etc. Accordingly, it is a complicate process for manufacturing the liquid crystal display panel and leads to a major factor of the manufacturing cost of the liquid crystal display panel.

SUMMARY OF THE INVENTION

Accordingly, it is an object of the present invention to provide a liquid crystal display device and a method of fabricating the same that is capable of simplifying the process and reducing the cost.

In order to achieve these and other objects of the invention, a liquid crystal display device according to an embodiment of the present invention comprises a gate line and a data line formed on a substrate; a thin film transistor formed at an intersection of the gate line and the data line; a pixel electrode connected to the thin film transistor; a common electrode substantially parallel to the pixel electrode; and a conductive pattern in contact with the common electrode at a lateral side surface of the common electrode.

In another aspect of the present invention, a method of fabricating a liquid crystal display device according to an embodiment of the present invention comprises forming a thin film transistor including a gate electrode, a source electrode and a drain electrode; forming a common electrode and a common line connected to the common electrode; and forming a transparent electrode pattern including a pixel electrode connected to the drain electrode and substantially parallel to the common electrode, and a conductive pattern in contact with the common electrode at a lateral side surface of the common electrode, by using a single mask.

In another aspect of the present invention, a method for forming a liquid crystal display device according to an embodiment of the present invention comprises forming a gate line and a data line on a substrate; forming a thin film transistor at an intersection of the gate line and the data line; forming a pixel electrode connected to the thin film transistor; forming a common electrode substantially parallel to the pixel electrode; and forming a conductive pattern in contact with the common electrode at a lateral side surface of the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings, in which:

FIGS. 5A to 5C are sectional views for sequentially explaining a method of fabricating the thin film transistor array substrate according to the first embodiment of the present invention;

FIGS. 6A to 6F are sectional views for specifically explaining a third mask process of FIG. 5C;

DETAILED DESCRIPTION OF THE ILLUSTRATED EMBODIMENTS

Reference will now be made in detail to the preferred embodiments of the present invention, examples of which are illustrated in the accompanying drawings.

Hereinafter, the preferred embodiments of the present invention will be described in detail with reference to FIGS. 3 to 10.

Figure 1:
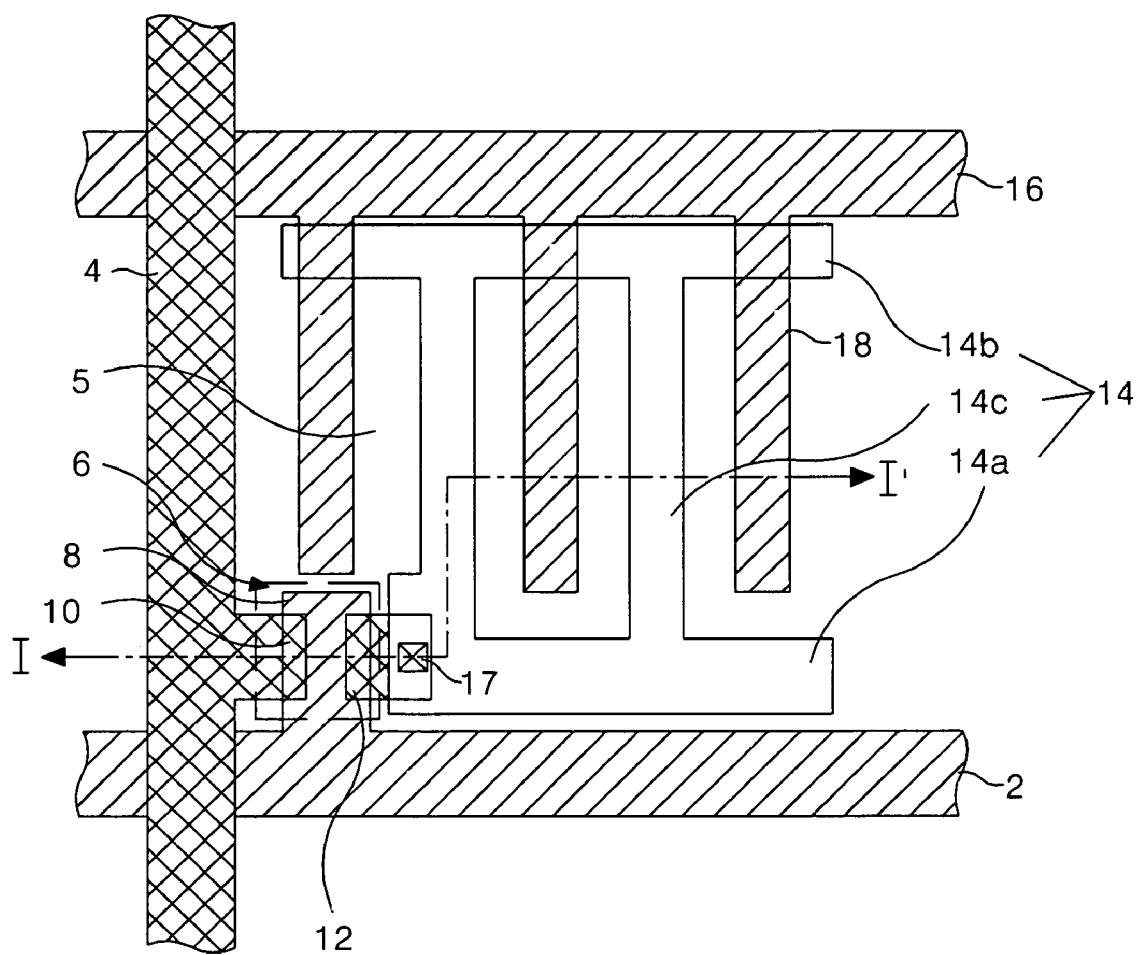
FIG. 1 is a plan view illustrating a thin film transistor array substrate of a related art liquid crystal display panel of a horizontal electric field type.
Figure 2:
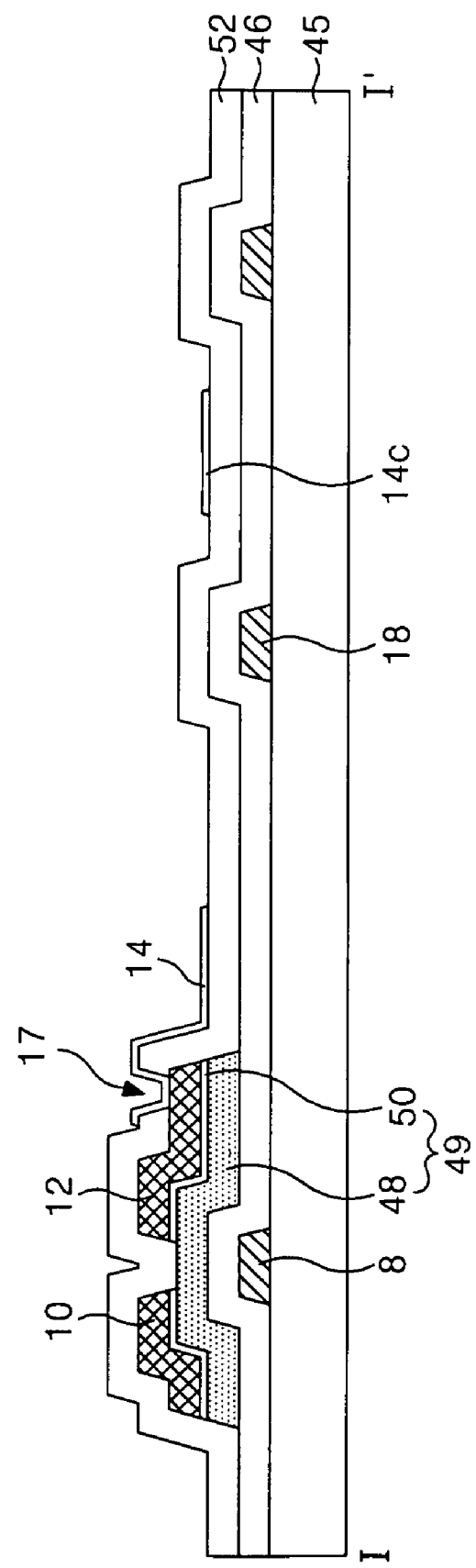
FIG. 2 is a cross-sectional view illustrating the thin film transistor array substrate taken along a line I-I' in FIG. 1.
Figure 3:
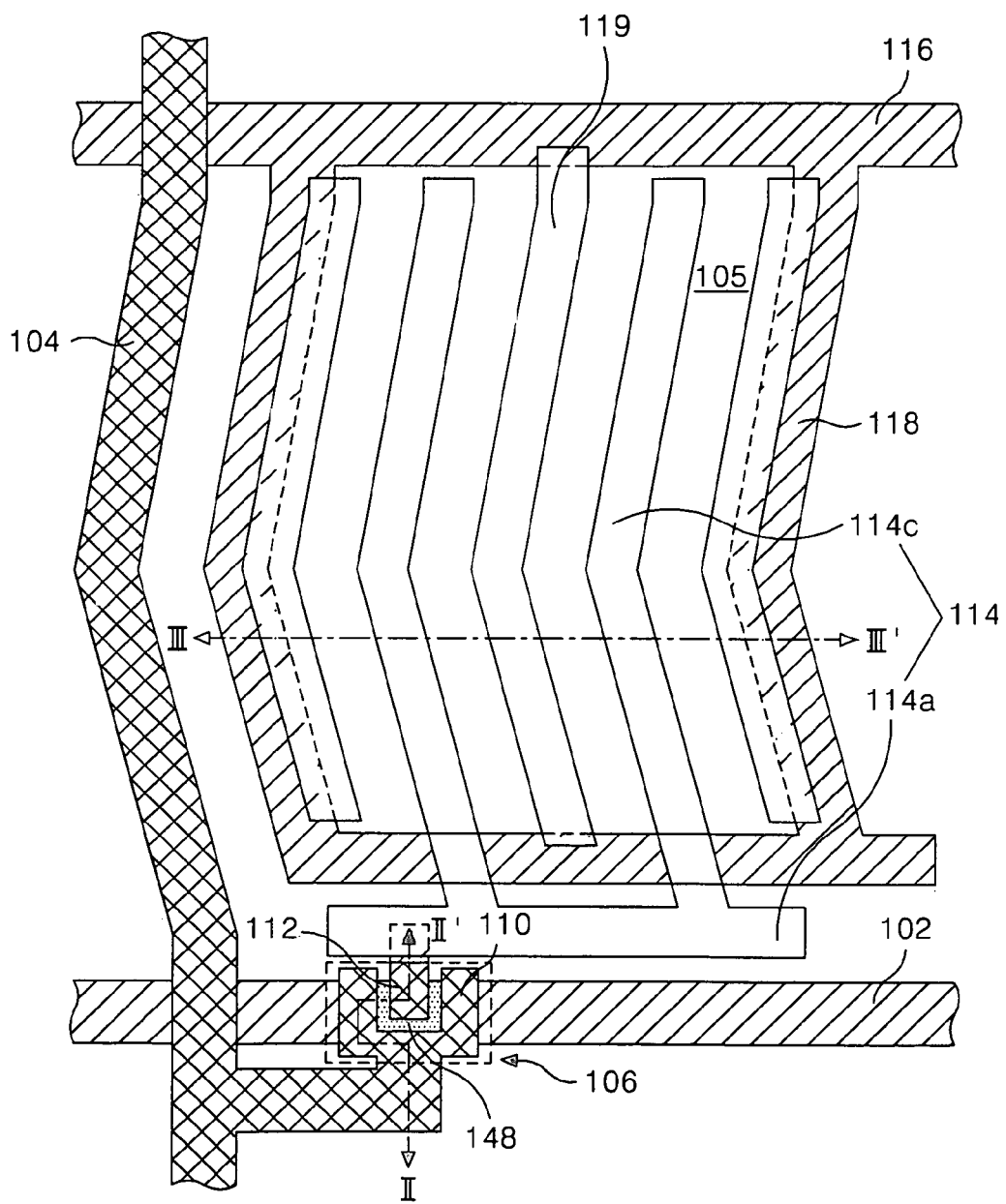
FIG. 3 is a plan view illustrating a thin film transistor array substrate of a liquid crystal display panel of a horizontal electric field type according to a first embodiment of the present invention.
Figure 4:
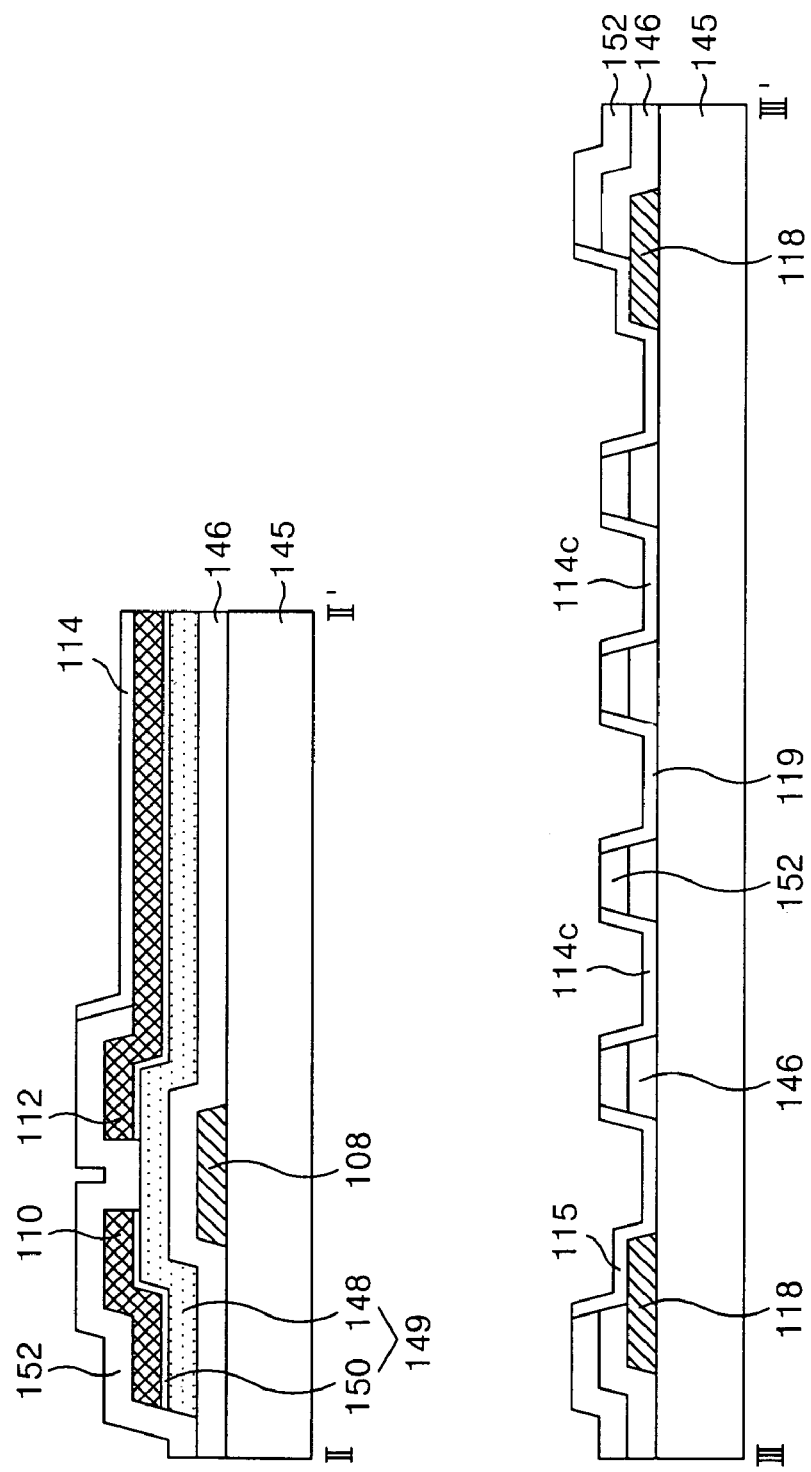
FIG. 4 is a cross-sectional view illustrating the thin film transistor array substrate taken along lines II-II' and III-III' in FIG. 3.

FIG. 3 is a plan view illustrating a thin film transistor array substrate of a liquid crystal display panel of a horizontal electric field type according to a first embodiment of the present invention, and FIG. 4 is a cross-sectional view illustrating the thin film transistor array substrate taken along lines II-II' and III-III' in FIG. 3.

Referring to FIG. 3 and FIG. 4, the thin film transistor array substrate includes a gate line 102 and a data line 104 provided on a lower substrate 145 in such a manner to intersect each other, a thin film transistor 106 provided at each intersection, a pixel electrode 114 and a common electrode 118 provided at a pixel area defined by the intersection structure for the purpose of forming a horizontal field, and a common line 116 connected to the common electrode 118.

The gate line 102 supplies a gate signal to a gate electrode 108 of the thin film transistor 106. The data line 104 supplies a pixel signal via a drain electrode 112 of the thin film transistor 106 to the pixel electrode 114. The gate line 102 and the data line 104 are formed in the intersection structure to define a pixel area 105.

The common line 116 is formed in parallel to the gate line with the pixel area 105 therebetween to supply the common voltage for driving the liquid crystal material to the common electrode 118. Further, the common line 116 is formed of the same material as the gate line 102.

The thin film transistor 106 allows the pixel signal of the data line 104 to be charged and maintained in the pixel electrode 114 in response to the gate signal of the gate line 102. The thin film transistor 106 includes the gate electrode 108 connected to the gate line 102, a source electrode 110 connected to the data line 104, and the drain electrode 112 connected to the pixel electrode 114. Further, the thin film transistor 106 further includes a semiconductor pattern 149 having an active layer 148, overlapping with the gate electrode 108 with having a gate insulating film 146 therebetween to define a channel between the source electrode 110 and the drain electrode 112. In the semiconductor pattern 149, an ohmic contact layer 150, located on the active layer 148 to make an ohmic contact with the data line 104, the source electrode 110, and the drain electrode 112, is further included. Meanwhile, the reference numeral '152' represents a passivation film.

The pixel electrode 114 is connected to the drain electrode 112 of the thin film transistor 106 and is provided at the pixel area 105. Particularly, the pixel electrode 114 includes a horizontal part 114a connected to the drain electrode 112 and provided in parallel with adjacent gate lines 102, and a finger part 114c provided in parallel to the common electrode 118.

The common electrode 118 is connected to the common line 116 and is formed of the same metal as the gate line 102 and the gate electrode 108 at the pixel area 105.

Specifically, a conductive pattern 115 is partially overlapped with the common electrode 118 located at an outermost of the pixel area 105. As shown in FIG. 4, the conductive pattern 115 is in contact with the common electrode 118 at the outermost of the pixel area 105 at the top surface and the lateral side surface of the common electrode 118. There is a second common electrode 119 located within the pixel area 105 separated from the common electrode 118. The second common electrode 119 includes a transparent electrode material (not a gate metal) and is partially overlapped with the common line 116, which is formed of the gate metal. As shown in the illustrated embodiment of FIG. 3 and 4, the second common electrode 119 is located between two common electrodes 118 at the outermost of the pixel area 105. In addition, the second common electrode 119 is in contact with the common line 116 at the top surface and the lateral side surface of the common line 116.

In the illustrated embodiment of FIGS. 3 and 4, there is a conductive line (not labeled) substantially parallel to the common line 116. Two ends of the common electrode 118 at the outermost of the pixel area 105 are respectively in contact with the common line 116 and the conductive line. In addition, two ends of the second common electrode 119 are also respectively in contact with the common line 116 and the conductive line. Specifically, the second common electrode 119 is in contact with the common line 116 at the top surface and the lateral side surface of the common line 116.

The thin film transistor array substrate of the illustrated embodiment having the above-mentioned structure is formed by three mask processes. Therefore, it is a simplified manufacturing process as compared to the related art and can reduce the manufacturing cost.

Hereinafter, a method of fabricating the thin film transistor array substrate formed by three mask processes will be described with reference to FIGS. 5A to 6F, as follows.

First, a gate pattern is formed by a photolithography process using a first mask and an etching process. In other words, after a gate metal layer is deposited on a lower substrate by a deposition method such as sputtering, the gate metal layer is patterned by the photolithography process and the etching process, to thereby form a gate pattern including a gate line 102, a gate electrode 108 connected to the gate line 102, a gate line 102, a common line 116, and a common electrode 118. Herein, the gate metal layer is formed of aluminum neodium (AlNd), aluminum, etc.

An inorganic insulating material is entirely deposited on the lower substrate 145 provided with the gate pattern, etc. by a deposition technique such as the PECVD, etc., thereby providing a gate insulating film 146. Herein, the gate insulating film 146 is formed of an inorganic insulating material such as silicon nitride ($SiN_x$) or silicon oxide ($SiO_x$), etc.

Thereafter, as shown in FIG. 5B, a semiconductor pattern and a source/drain pattern are formed by a photolithography using a second mask and an etching process. To describe this second mask process more specifically, an amorphous silicon layer, a $n^+$ amorphous silicon layer and a source/drain metal layer are sequentially formed on the lower substrate 145 having the gate insulating film 146. The amorphous silicon layer, the $n^+$ amorphous silicon layer and the source/drain metal layer are patterned by a photolithography process using a diffractive exposing mask and an etching process, to thereby form a source/drain pattern including a data line 104, a source electrode 110, and a drain electrode 112, and a semiconductor pattern 149 including an ohmic contact layer 150 and an active layer 148. Then, the ohmic contact layer 150 is etched by using the source and drain electrodes 110 and 112 as a mask to thereby expose the active layer 148. Herein, the data metal material is selected from chrome (Cr), molybdenum (Mo) or titanium (Ti), etc.

Figure 5C:
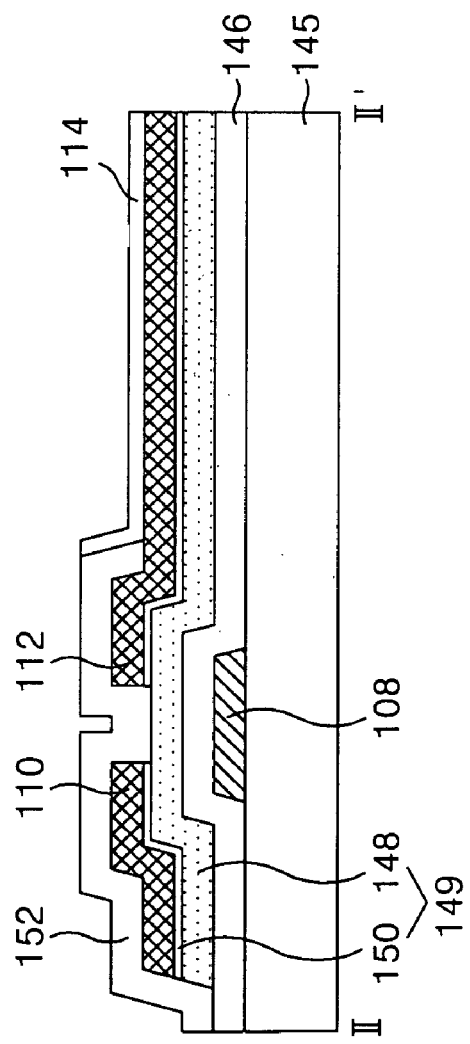

Finally, as shown in FIG. 5C, a transparent electrode pattern is formed by a photolithography process using a third mask and an etching process. Herein, the transparent electrode pattern includes a pixel electrode 114, a conductive pattern 115 connected to a common electrode 118 at an outermost of the pixel area 105, and a second common electrode 119 located within the pixel area 105 and connected to the common line 116.

Figure 6F:
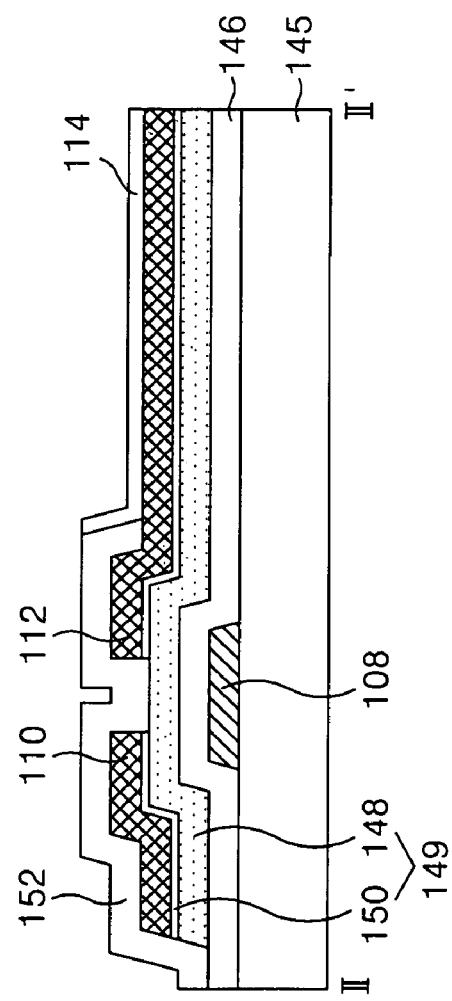
Figure 6F:
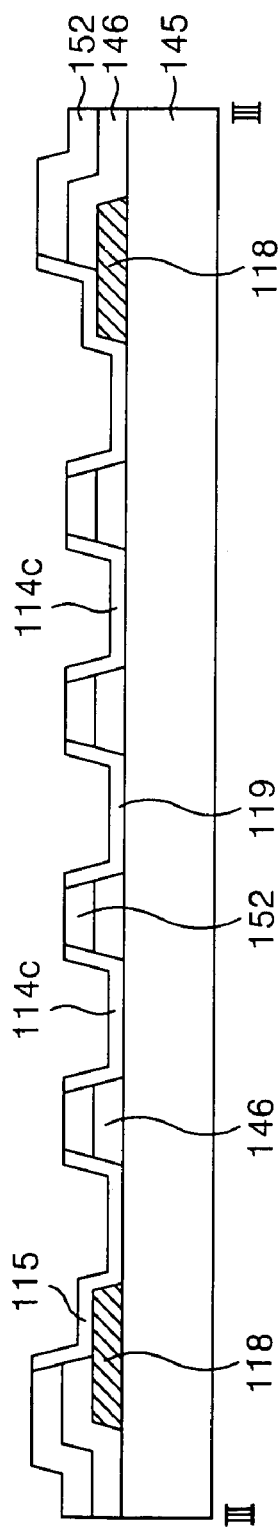

Hereinafter, the process using the third mask will be specifically described with reference to FIGS. 6A to 6F. First, the passivation film 152, made of an inorganic insulating material such as silicon nitride ($SiN_x$) or silicon oxide ($SiO_x$), etc., and a first photo-resist are sequentially formed on the lower substrate 145 having the source/drain pattern. Then a photo-resist pattern 132 is formed by a photolithography process as shown in FIG. 6A.

Thereafter, the passivation film 152 and the gate insulating film 146 are patterned by using the photo-resist pattern 132 as a mask, to thereby form a groove 134 of a line shape to partially expose the lower substrate 145 and to expose the drain electrode 112 of the thin film transistor 106, as shown in FIG. 6B.

The transparent electrode material 120 is deposited on the lower substrate 145 provided with the passivation film 152 and the gate insulating film 146. Herein, the transparent electrode material. 120 is formed of indium-tin-oxide (ITO), tin-oxide (TO), indium-zinc-oxide (IZO) or indium-tin-zinc-oxide (ITZO), etc.

As shown in FIG. 6C, a second photo-resist 136 is entirely deposited on the lower substrate 145 on which the transparent electrode material 120 is deposited. In this case, the second photo-resist 136 is filled in the grooves 134 of a line shape.

Thereafter, an ashing process is performed to expose the transparent electrode material 120 as shown in FIG. 6D. An etching process is performed in a state that the transparent electrode material 120 is exposed, so that the transparent electrode material 120 exists in only grooves 134 of a line shape as shown in FIG. 6E.

Subsequently, a stripping process is performed to thereby form the pixel electrode 114, which is parallel to the common electrode 118 located at the outermost of the pixel area, the conductive pattern 115 connected to the common electrode 118 of the outermost of the pixel area 105, and the second common electrode 119 located within the pixel area 105. Herein, the second common electrode 119 within the pixel area 105 and the common line 116 are in contact with each other in the same way as the contact between the common electrode 118 of the outermost of the pixel area 105 and the conductive pattern 115.

As described above the thin film transistor array substrate of a horizontal electric field type liquid crystal display panel according to the first embodiment of the present invention can be formed by the patterning process using three masks, so that the manufacturing process becomes simplified and the manufacturing cost becomes reduced.

Meanwhile, in the thin film transistor array substrate of a horizontal electric field type liquid crystal display panel according to the first embodiment of the present invention, it may have a problem as follows.

Figure 7:
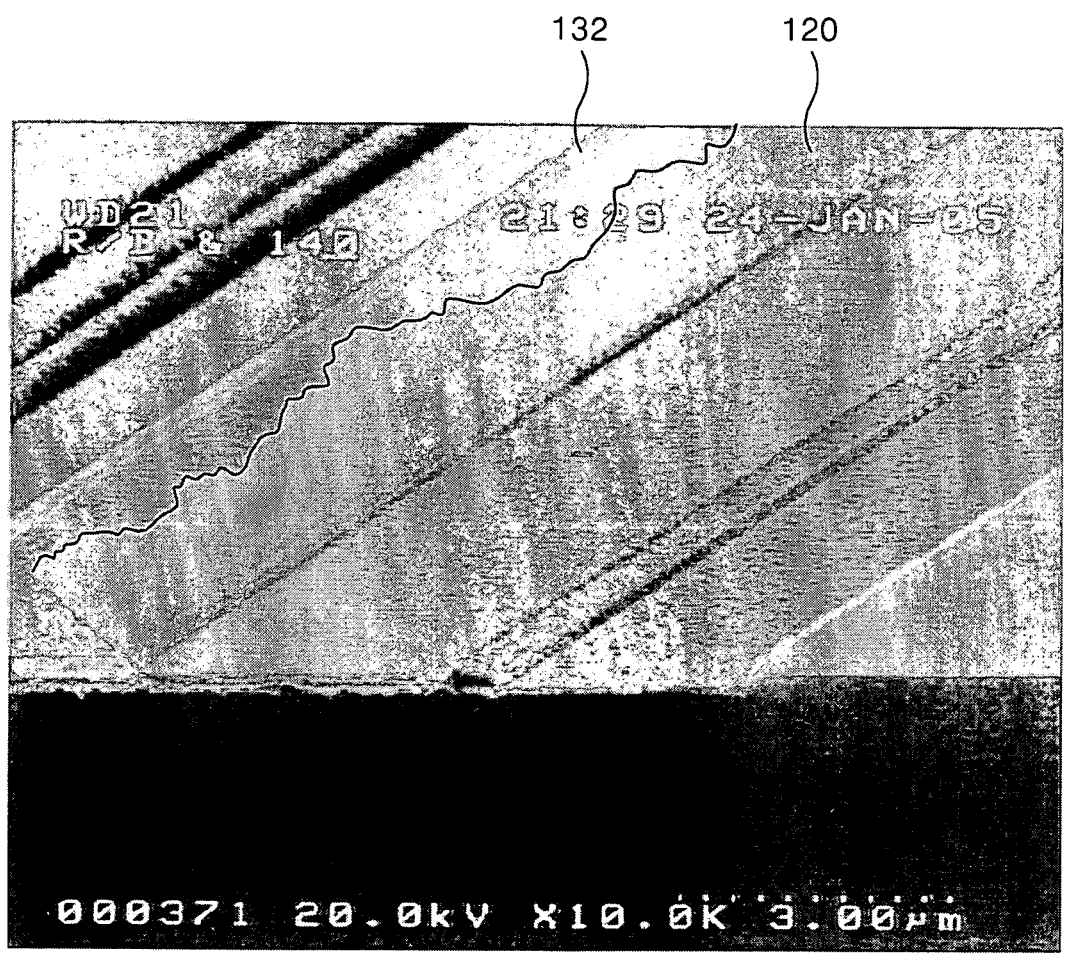
FIG. 7 is a photo a remainder of a transparent electrode material capable of appearing in the first embodiment of the present invention.

In FIG. 6C, in a case that the transparent electrode material 120 is deposited and then the transparent electrode material 120 is baked, the transparent electrode material 120 connected to the gate metal having high heat conductivity becomes crystallized (poly). Accordingly, the etching of the transparent electrode material 120 may not be performed well so that the transparent electrode material 120 partially remains on the photo-resist pattern 132 as shown in FIG. 7. Such a remaining transparent electrode material 120 functions as a particle in the pixel area 105 and will deteriorate a picture quality or be a factor generating short circuiting between electrodes.

Accordingly, a structure for preventing the above-mentioned problem is provided in a second embodiment of the present invention.

Figure 8:
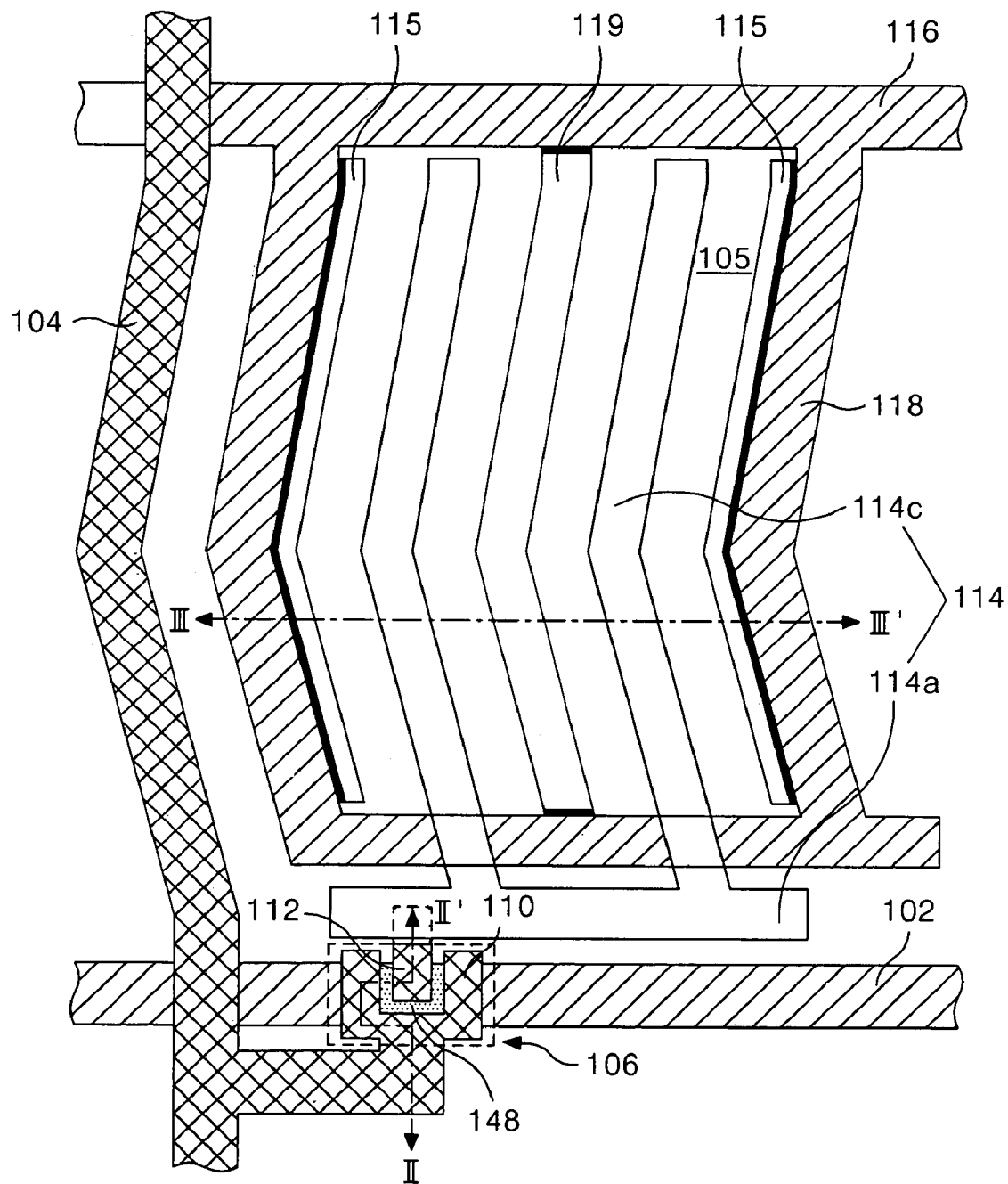
FIG. 8 is a plan view illustrating a thin film transistor array substrate of a liquid crystal display panel of a horizontal electric field type according to a second embodiment of the present invention.
Figure 9:
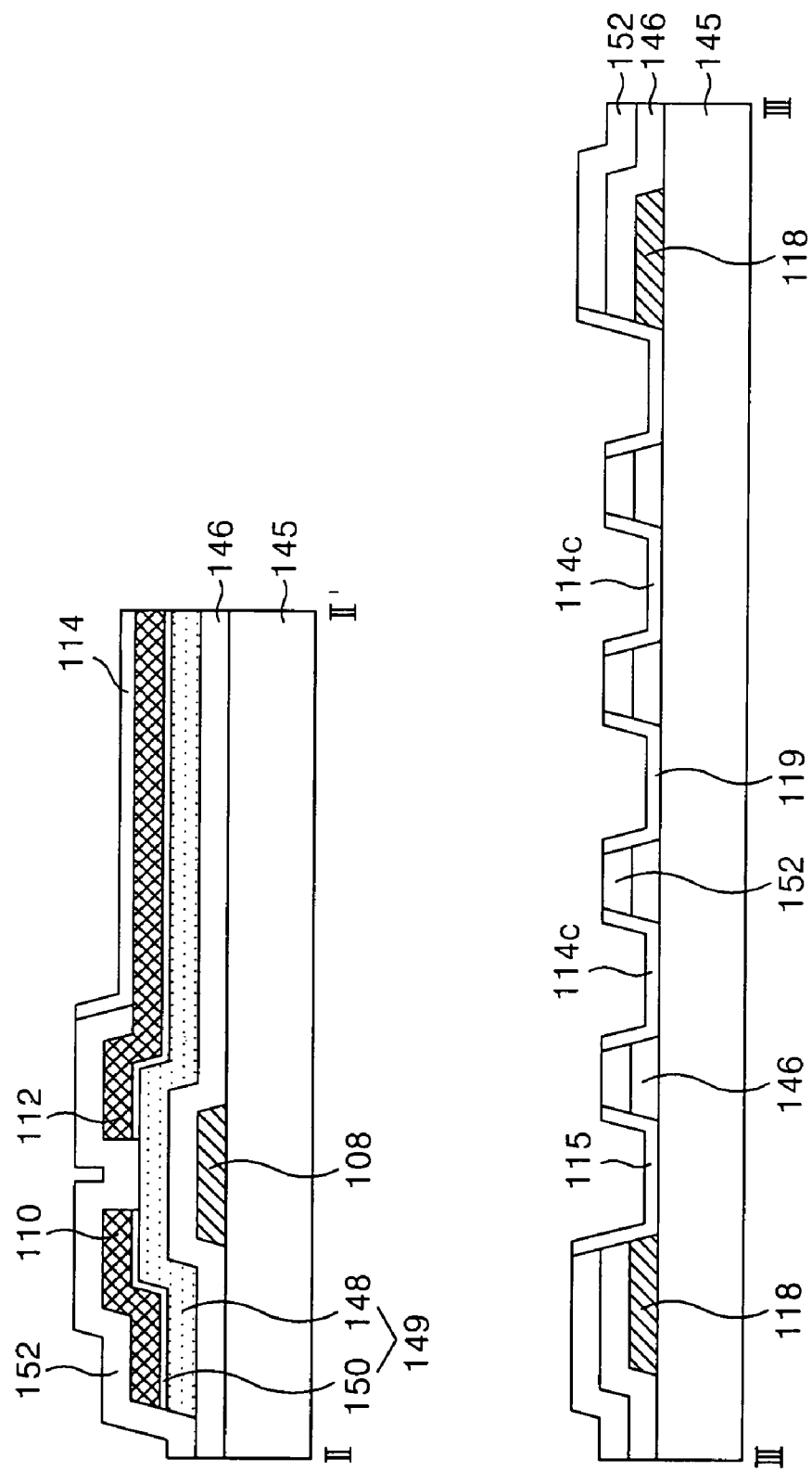
FIG. 9 is a cross-sectional view illustrating the thin film transistor array substrate taken along lines II-II' and III-III' in FIG. 8.

FIG. 8 is a plan view illustrating a thin film transistor array substrate of a liquid crystal display panel of a horizontal electric field type according to a second embodiment of the present invention, and FIG. 9 is a cross-sectional view illustrating the thin film transistor array substrate taken along lines II-II' and III-III' in FIG. 8.

Figure 5C:
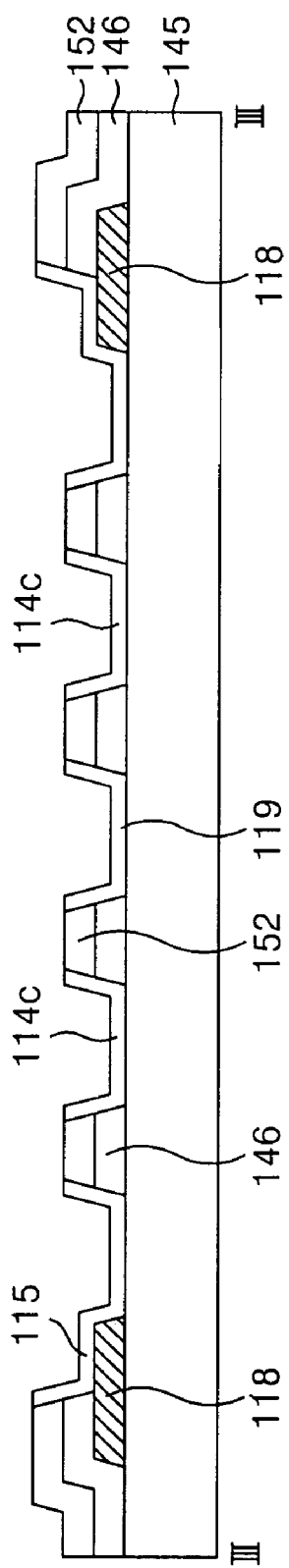

The thin film transistor array substrate shown in FIGS. 8 and 9 has components identical to those of the thin film transistor array substrate shown in FIG. 4 except that the common electrode 118, located at the outermost of the pixel area 105 is contacted with the conductive pattern 115 at a lateral side surface. Therefore, the same components as in FIGS. 4 and 5 are given the same reference numeral and the detail description thereof is to be omitted.

In the thin film transistor array substrate of a liquid crystal display panel of a horizontal electric field type shown in FIGS. 8 and 9, the common electrode 118 located at the outermost of the pixel area 105 is connected with the conductive pattern 115 at a lateral side surface of the common electrode 118. Furthermore, the second common electrode 119 located within the pixel area 105 is in contact with the common line 116 at a lateral side surface of the common line 116. Accordingly, the contact between the gate metal pattern and the transparent electrode material is minimized, to thereby minimize a crystallization of the transparent electrode material. As a result, after the photo-resist pattern is stripped, the transparent electrode material will not remain.

Meanwhile, the thin film transistor array substrate of the liquid crystal display panel of a horizontal electric field type according to the second embodiment of the present invention is formed by the same method as in FIGS. 5A to 6F except that the gate insulating film 146 remains so as to cover the common electrode 118 located at the outermost of the pixel area 105. Therefore, the transparent electrode material is in contact with the common electrode 118 at a lateral side surface of the common electrode 118 in the third mask process. Therefore, a detailed description on the fabricating method will not be discussed here.

Figure 10:
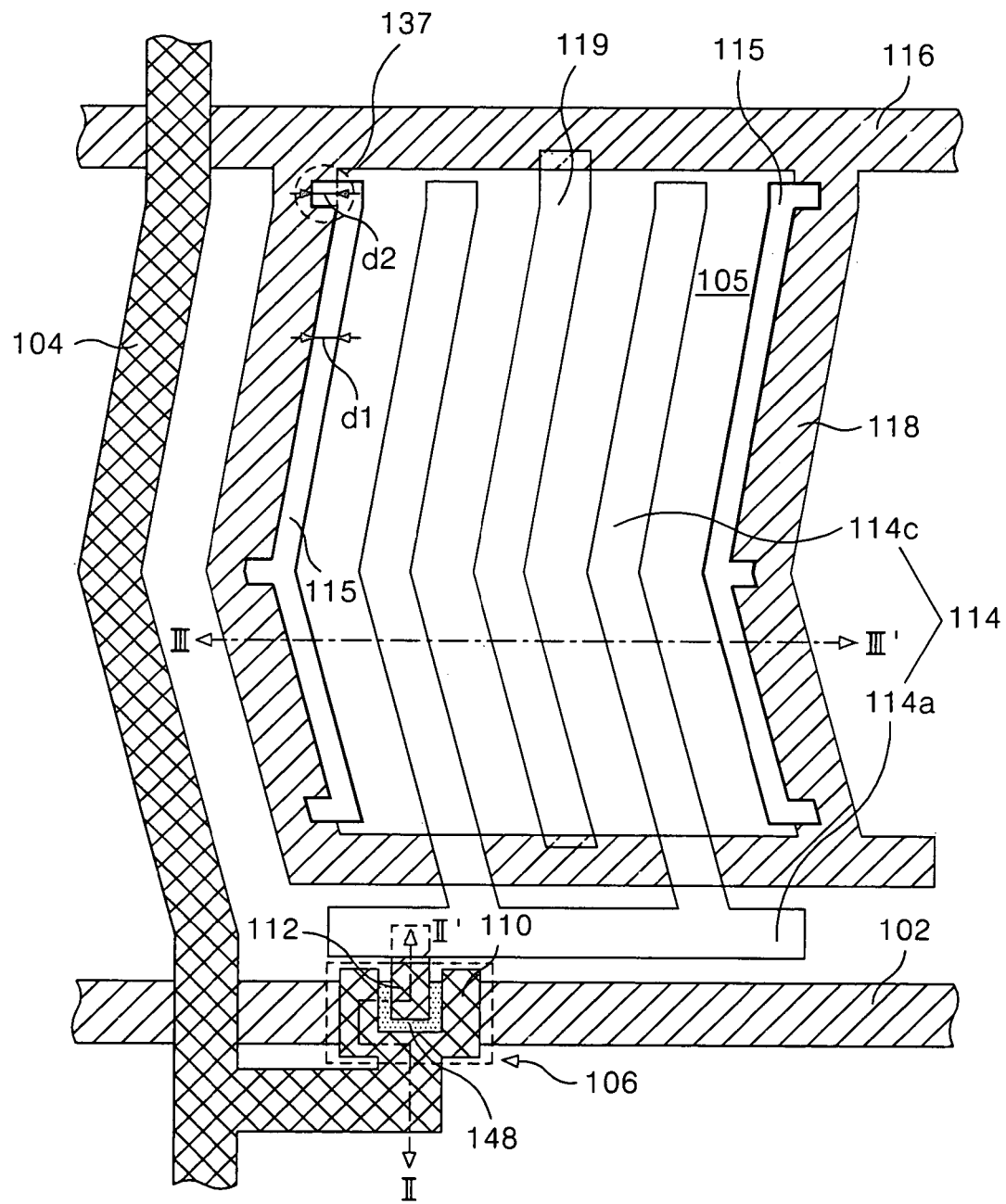
FIG. 10 is a plan view illustrating a thin film transistor array substrate of a liquid crystal display panel of a horizontal electric field type according to a third embodiment of the present invention.

FIG. 10 is a plan view illustrating a thin film transistor array substrate of a liquid crystal display panel of a horizontal electric field type according to a third embodiment of the present invention.

In the thin film transistor array substrate shown in FIG. 10, a common electrode 118 located at an outermost of a pixel area 105 is in contact with a conductive pattern in a side surface like the thin film transistor array substrate shown in FIGS. 8 and 9. In addition, an extremely partial conductive pattern 115 is formed to be overlapped with the common electrode 118 similar to the first embodiment shown in FIGS. 3 and 4. The thin film transistor array substrate shown in FIG. 10 has the same components as in FIGS. 3 to 8 except for the characteristic on the above-mentioned structure. Therefore, the same components as in FIGS. 3 to 8 are given the same reference numerals and the detail description thereof will not be discussed here.

In the second embodiment of the present invention, the conductive pattern 115 and the common electrode 118 are connected at a lateral side surface. Therefore, the reliability of the connection may be deteriorated. Accordingly, the third embodiment of the present invention further includes an extending portion 137 in at least any one of both ends and a center of the conductive pattern 115 so as to minimize crystallization and to improve the reliability of the connection between the conductive pattern 115 and the common electrode 118.

In other words, the extending portion 137, capable of minimizing the connection between the common electrode 118 formed of the gate metal pattern and the conductive pattern 115 formed of the transparent electrode material and capable of having better reliability of the connection, is further formed. Therefore, it is possible to minimize crystallization of the transparent electrode material (conductive pattern) and to maintain a better contact between the conductive pattern 115 and the common electrode 118. Herein, a line width d1 of the conductive pattern 115 is about 2.5 μm~3.5 μm. A length d2 of the extending portion 137, extending from the conductive pattern 115 to overlap with the common electrode 118, is about 1.5 μm~2.5 μm.

Meanwhile, a method of fabricating the thin film transistor array substrate of the liquid crystal display panel of a horizontal electric field type according to the third embodiment of the present invention keeps the gate insulating film 146 and the passivation film 152 to be overlapped with the common electrode 118 located at the outermost of the pixel area 105. Therefore, the transparent electrode material is connected to the common electrode 118 at a lateral side of the common electrode 118, in the third mask process. Further, the thin film transistor array substrate of the liquid crystal display panel of a horizontal electric field type according to the third embodiment of the present invention is formed by the same method as in FIGS. 5A to 6F except that the extending portion 137, extending from both ends and the central portion of the conductive pattern 115, or any portion between the two ends of the conductive pattern 115, is further formed.

As described above, in the liquid crystal display panel of a horizontal electric field type and the method of fabricating the same according to the illustrated embodiments, the thin film transistor array substrate can be formed by the patterning process using three masks. Therefore, the manufacturing process becomes simplified and the manufacturing cost becomes reduced. Further, crystallization of the transparent electrode material (the conductive pattern in the embodiment) connected to the gate metal (the common electrode in the embodiment) is minimized, to thereby prevent that the transparent electrode material from remaining after stripping process.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
a gate line and a data line formed on a substrate;
a thin film transistor formed at an intersection of the gate line and the data line;
a pixel electrode connected to the thin film transistor;
a common electrode substantially parallel to the pixel electrode;
a first transparent conductive pattern directly contacted with a surface of the common electrode substantially nonparallel to a plane of the substrate, wherein the common electrode and the first transparent conductive pattern are located at an outermost of a pixel area;
a common line substantially parallel to the gate line and commonly connected to the common electrode to supply a common voltage to the common electrode; and
a second transparent conductive pattern located at a central portion of the pixel area separated from the first transparent conductive pattern, wherein the second transparent conductive pattern is contacted with a surface of the common line substantially nonparallel to the plane of the substrate, and not overlapped with a surface of the common line substantially parallel to the plane of the substrate,
wherein at least a part of the first transparent conductive pattern is contacted with only the surface of the common electrode substantially nonparallel to a plane of the substrate, and
wherein the first and second transparent conductive patterns are made of only transparent electrode material and not overlapped with the pixel electrode.

2. The liquid crystal display device according to claim 1, wherein the second transparent conductive pattern is made of the same material as the first transparent conductive pattern and the pixel electrode.

3. The liquid crystal display device according to claim 1, wherein the common electrode in contact with the first and second transparent conductive patterns is made of the same material as the gate line.

4. A method for forming a liquid crystal display device, comprising:
forming a gate line and a data line on a substrate, and a common line substantially parallel to the gate line;
forming a thin film transistor at an intersection of the gate line and the data line;
forming a pixel electrode connected to the thin film transistor;
forming a common electrode substantially parallel to the pixel electrode; and
forming a first transparent conductive pattern directly contacted with a surface of the common electrode substantially nonparallel to a plane of the substrate, and a second transparent conductive pattern in a pixel area separated from the first transparent conductive pattern,
wherein the common electrode and the first transparent conductive pattern are located at an outermost of the pixel area,
wherein at least a part of the first transparent conductive pattern is contacted with only the surface of the common electrode substantially nonparallel to a plane of the substrate,
wherein the second transparent conductive pattern is located at a central portion of the pixel area,
wherein the second transparent conductive pattern is contacted with the surface of the common line substantially nonparallel to the plane of the substrate, and not overlapped with a surface of the common line substantially parallel to the plane of the substrate, and
wherein the first and second transparent conductive patterns are made of only transparent electrode material and not overlapped with the pixel electrode.

* * * * *